Patented Oct. 31, 1939

2,178,173

UNITED STATES PATENT OFFICE 2,178,173

DERIVATIVES OF POLYMERIZED ALKYLOL-
AMINES

Morris B. Katzman and Albert K. Epstein, Chicago, Ill., assignors to The Emulsol Corporation, Chicago, Ill.

No Drawing. Application May 17, 1937,
Serial No. 143,134

28 Claims. (Cl. 260—401)

Our invention relates to new chemical compounds which have particular utility in the arts where interface modifying functions are required.

One of the objects of our invention is the preparation of new chemical compounds having utility as detergent, emulsifying, flotation, and, in general, interface modifying agents in the arts where such functions are desired.

A particular object of our invention resides in the preparation of new chemical compositions of matter which are unusually effective in enhancing the emulsification of oleaginous and aqueous materials.

Still another object of our invention deals with improvements in the preparation of oleaginous and aqueous emulsions generally and particularly cosmetic emulsions such as face creams, cold creams, and other types of creams.

A further object of our invention is concerned with new methods of preparing the novel chemical compositions which are, in part, the subject matter of the present invention.

Other objects and features of the invention will become more apparent as the description proceeds.

In general, our invention is based upon the discovery that if a plurality of groups of a lipophile character, containing the residues of higher molecular weight carboxylic acids or alcohols, particularly higher molecular weight fatty acids and their corresponding alcohols, are attached by means of phosphorus and nitrogen, sulphur and nitrogen, or boron and nitrogen, to groups which have a smaller proportion of hydrophile radicals such as hydroxy groups, such compounds have excellent interface modifying properties and are particularly efficacious in the preparation of emulsions wherein oleaginous material such as oil is predominantly the continuous phase and water is the dispersed phase.

By the term "lipophile" as used hereinabove, we mean to designate organic radicals with fatty characteristics. In general, such radicals consist primarily of carbon and hydrogen, although they may include ether and/or ester linkages or other oxygen-containing groups. We have employed this term "lipophile" to denote that the radical so designated has a distinct affinity for hydrocarbons, oils, fats, waxes and other fatty materials, and imparts a tendency to the molecule, of which it is a part, to be wetted by fatty materials.

The term "hydrophile" is used in counter-distinction to the term "lipophile" and is intended to cover radicals consisting primarily of hydrogen and oxygen in the form of hydroxy groups. The hydrophilic character manifests itself by an affinity for water and aqueous media, and the hydrophile radical imparts to the molecule, of which it is a member, a tendency to be wetted by water and aqueous media. The degree or extent of the hydrophilic character is dependent upon the number of hydroxy groups and their location in the molecule, and is also influenced by the number and character of lipophile groups with which they are associated in the molecule.

In general, the compounds of our invention are prepared by polymerizing alkylolamines at elevated temperatures, preferably in the presence of a suitable catalyst, whereby molecules of increased molecular weight containing two or more nitrogen atoms are produced. Such polymerized alkylolamines are then reacted with higher molecular weight carboxylic acids, particularly higher fatty acids, or their corresponding alcohols, or with derivatives of such acids as, for example, halides, anhydrides, esters including triglycerides and the like, the resulting compounds being then reacted with acid reacting oxygenated sulphur, oxygenated phosphorus, or oxygenated boron compounds containing at least one lipophile group with not less than six carbon atoms to produce final products having excellent interface modifying properties and which are particularly efficacious in the preparation of emulsions wherein oleaginous material such as oil is predominantly the continuous phase and water is the dispersed phase.

The polymerization of the alkylolamines is conducted at elevated temperatures whereby polymers containing at least two nitrogens in the molecule are obtained. Thus, for example, two or more mols of triethanolamine, diethanolamine or mixtures of mono-, di- and tri-ethanolamines may be present in the polymers and there are also present therein free hydroxy groups which are capable of reaction with higher molecular weight carboxylic acids, acyl halides, and triglyceride oils or fats in order to produce esters of said polymerized alkylolamines. Alternatively, as indicated above, reaction may be had between the polymerized alkylolamines and higher molecular weight fatty alcohols or compounds containing alcoholic groups whereby ethers are formed. The polymerization of the alkylamines is effected by heating said alkylolamines at elevated temperatures, generally of the order of 200 degrees C. to 250 degrees C., preferably in the presence of a catalyst such as sodium hydroxide, potassium hydroxide, sodium ethylate, sodium glycerate, or other alkali catalysts such as disclosed hereinafter for re-esterification of triglycerides with the polymerized alkylolamines, the proportion of catalyst being variable but generally of the order of 1/10% to 1%. In the case of the presence of monoethanolamine or diethanolamine or mixtures thereof or in the case of other alkylolamines having a relatively low boiling point, the polymerization may be carried out under a reflux in order not to lose some of the lower boiling point constituents. Alternatively, the volatile constituents may be distilled and recovered from the distillate by condensation. While polymerization of the alkylolamines can be effected at elevated temperatures without the use of a catalyst, it is very much preferable to use a catalyst of the character indicated whereby the speed of the reaction is enhanced and products are obtained having better color.

Among the higher molecular weight carboxylic acids which may be utilized either as such or in the form of derivatives such as acyl halides, esters, particularly triglycerides, anhydrides and the like for reaction with the polymerized alkylolamines to produce esters thereof are the following: caproic, capric, caprylic, hydroaromatic acids such as abietic acid, aromatic acids such as benzoic, benzoylbenzoic, naphthoic, toluic, and naphthenic acids, hydroxystearic acid, higher molecular weight saturated and unsaturated fatty acids, particularly those derived from natural fats and oils, such as palmitic acid, stearic, lauric, myristic, melissic, oleic, ricinoleic, linoleic, or mixed higher fatty acids derived from animal or vegetable fats and fish oils such as lard, oleo oil, coconut oil, corn oil, cottonseed oil, soya bean oil, partially or completely hydrogenated vegetable oils such as cottonseed oil, corn oil, sesame oil, and fatty acids of various waxes such as beeswax and carnauba wax. As indicated above, instead of the acids, the corresponding alcohols may be employed in which case ethers apparently result, but we do not regard this latter practice as the preferred embodiment of our invention.

As stated above, we may, and preferably do, form the esters of the polymerized alkylolamines by reaction thereof with triglycerides, the reaction being one of re-esterification and being effected at elevated temperatures, preferably of the order of 200 degrees C. to 250 degrees C. although it is evident that the exact temperature employed will vary depending upon the specific nature of the reacting materials utilized, the speed of reaction desired, and whether or not a re-esterification catalyst is employed. Suitable catalysts of this type are alkaline materials such as sodium hydroxide, potassium hydroxide, alkali metal alcoholates and glycerates such as sodium ethylate and sodium glycerate, soaps such as calcium, sodium, potassium and ammonium salts of higher fatty acids, and the like. The catalyst may be dispensed with entirely and excellent results obtained or, if employed, small percentages, of the order of 0.1% to 1.0%, based on the weight of the reacting materials, or even more or less, are very effective.

The triglyceride oils and fats which may be utilized for re-esterification with the polymerized alkylolamines are derived from animal and vegetable sources and include the following: cottonseed oil, coconut oil, corn oil, sesame oil, soya bean oil, lard, oleo oil, sardine oil, fish oils, stearine, and said oils whether partially or completely hydrogenated. We have obtained particularly satisfactory products with coconut oil. Instead of re-esterification of a triglyceride with the polymerized alkylolamine, we may employ partially esterified polyhydroxy substances or polyhydric alcohols such as a mono- or di-glyceride of a higher fatty acid as, for example mono- or di-glycerides of coconut oil fatty acids or of other higher fatty acids, or polyhydroxy substances partially esterified with higher fatty acids such as diethylene glycol mono- higher fatty acid esters. In general, these partially esterified polyhydroxy substances may be represented by the formula $$(RO)_v—X—(OH)_w$$

wherein R is a higher acyl radical, X is the carbon-hydrogen residue of the polyhydroxy substance, and, $v$ and $w$ are small whole numbers. The polyhydroxy substances, the carbon-hydrogen residues of which are represented by X in the above general formula, include glycerol, glycols, polyglycerols, polyglycols, sugars, sugar alcohols, hydroxyboxylic acids and the like. In general, when such compounds are employed in the re-esterification reaction with the polymerized alkylolamines, as described above, lower temperatures can be effectively employed. Thus, for example, in re-esterifying monostearin with polymerized commercial triethanolamine, temperatures of about 150 degrees C. have been found very suitable and the reaction appears to proceed well at a temperature even as low as about 135 degrees C. It will be appreciated, however, that the temperature of reaction will vary to some extent since some compounds are inherently more reactive than others. The disclosure herein of temperature ranges is, therefore, to be taken as illustrative or descriptive and in no sense limitative.

The alkylolamines which we employ for the initial preparation of the polymerized alkylolamines are varied and include ethanolamines such as monoethanolamine, diethanolamine, triethanolamine, and mixtures thereof such as are present in commercial triethanolamine; propanol amines, butanolamines, pentanolamines, hexanolamines, glycerol amines, and mixtures thereof, as, for example:

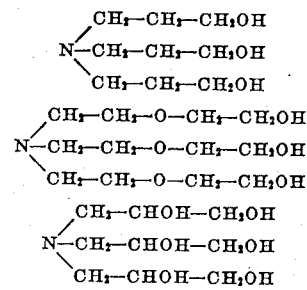

Because of the commercial availability at the present time and because of the particularly satisfactory results obtained, we prefer to utilize commercial triethanolamine which contains minor percentages of mono- and di-ethanolamine. It is, of course, obvious that the same alkylolamine need not be used in the polymerization step. Mixtures of different alkylolamines may be employed and, in addition, mixtures of polymerized alkylolamines may be used in the subsequent esterification or etherification step of the process.

In the light of the foregoing, it will be understood that we initially produce, preferably, higher carboxylic esters of polymerized alklylolamines, as described above, and preferably by re-esterifying a triglyceride oil or fat, for example, coconut oil, with a polymerized alkylolamine, preferably derived from triethanolamine or commercial triethanolamine. The resulting ester is then reacted with an acid-reacting oxygenated phosphorus, oxygenated sulphur, or an oxygenated boron compound containing a lipophile group with at least six carbon atoms, preferably at temperature of 100 degrees C. or less, to produce the products of our invention. The temperature limitation for this latter reaction is the practical one, namely, that a temperature should be employed below that at which decomposition of any of the reacting constituents or of the ultimate product takes place. In general, the sulphuric acid esters are reacted at lower temperatures than the phosphoric or pyrophosphoric acid esters.

Among the oxygenated phosphorus compounds which may be employed for this purpose are phosphoric acid esters and phosphoric acid derivatives of higher molecular weight alcohols, particularly the saturated and unsaturated straight chain higher molecular weight aliphatic alcohols, such as lauryl phosphate, cetyl pyrophosphate, melissyl phosphate, cetyl phosphate, lauryl tetraphosphate, cholesteryl phosphate, or similar phosphoric acid esters containing unesterified hydroxy groups, in which the hydrogen thereof is acidic, attached to phosphorus; phosphoric acid esters of higher molecular weight alkyl or acyl derivatives of polyhydroxy substances, such as the meta-, ortho-, pyro-, and tetra-phosphoric acid esters of monostearin and monoolein, tetra- and pyrophosphoric acid ester of diethylene glycol monolaurate, and similar compounds containing free hydroxy groups, in which the hydrogen thereof is acidic, attached to phosphorus. For a more complete disclosure of numerous compounds which may be employed for reaction with the polymerized alkylolamine esters, reference may be had to United States Patents No. 2,026,785, No. 2,025,029, and No. 2,053,653; to the copending application of Benjamin R. Harris, Serial No. 106,194, filed October 17, 1936; and to the co-pending application of Morris B. Katzman, Serial No. 135,931, filed April 9, 1937. It will be understood that, for the purposes of our present invention, the unneutralized or partially neutralized phosphoric acid esters are employed.

Instead of utilizing oxygenated phosphorus derivatives as described above, the corresponding acid-reacting sulphur derivatives may be effectively employed. These substances include octyl sulphate, lauryl sulphate, myristyl sulphate, cetyl sulphonic acid, cetyl sulphate, cholesteryl sulphate, monostearin sulphate, sulphated and sulphonated oils such as sulphated castor oil, coconut oil mono fatty acid esters of diethylene glycol sulphate, and the like, and are quite fully disclosed in United States Patents Nos. 1,968,794, 1,968,797, 2,023,387, and 2,006,309. It will be understood that, as in connection with the oxygenated phosphorus derivatives, the unneutralized or partially neutralized compounds are employed.

Again, in place of either the oxygenated phosphorus or oxygenated sulphur compounds, similar as well as corresponding acid-reacting oxygenated boron compounds may be employed. These include boric acid esters of higher molecular weight alcohols such as lauryl borate, cetyl borate, and boric acid esters of monoglycerides of higher fatty acids such as monostearin borate. For a more complete description of such or similar compounds, reference may be had to United States Patent No. 2,052,192.

Some of the acid-reacting oxygenated phosphorus, oxygenated sulphur, and oxygenated boron compounds which we employ herein may be represented by the general formula $$(RO)_v-X-Y_w$$

wherein R is a member selected from the group consisting of alkyl and acyl radicals containing at least six carbon atoms, X is the residue of a polyhydroxy substance, Y is a member selected from the group consisting of oxygenated phosphorus, oxygenated sulphur, and oxygenated boron radicals which is attached to the polyhydroxy substance through an ester linkage, and $v$ and $w$ are small whole numbers.

We have obtained unusually satisfactory results with, and, therefore, prefer to employ, the unneutralized or partially neutralized pyrophosphoric acid esters of higher fatty acid monoglycerides, particularly of monoglycerides wherein the fatty acid radical contains between 12 and 18 carbon atoms.

The following examples are illustrative of specific embodiments of our invention. It will be understood that they are given by way of example only, in order that those skilled in the art will have a clearer picture of how the invention may be successfully practiced, and are not to be construed as limiting our invention in any way. Thus, for example, the proportions of reacting materials, the temperature and length of time of the reaction, and other conditions may be varied without departing from the scope of our invention as defined in the appended claims.

*Example I*

To 200 parts by weight of commercial triethanolamine (containing minor proportions of mono- and di-ethanolamines) there were added 2 parts by weight of sodium hydroxide and the mixture was heated with stirring for 3 hours at 250 degrees C. to 255 degrees C. at which time a molecular weight determination of the reaction product showed substantially twice the molecular weight of the original commercial triethanolamine as a result of polymerization having taken place.

To 51 parts by weight of the resulting polymerized triethanolamine there were added 44 parts by weight of a partially hydrogenated cottonseed oil having a melting point of about 100 degrees F. and the mixture was heated with stirring for 20 minutes at 250 degrees C. whereupon the reaction mixture became homogeneous.

To 20 parts by weight of the resulting product, cooled to about 80 degrees C. to 100 degrees C. there were added 10 parts by weight of monostearin pyrophosphate previously prepared by reacting 19 parts by weight of commercial monostearin with 4½ parts by weight of pyrophosphoric acid at 90 degrees C. with stirring. The monostearin pyrophosphate was added to the product from the previous step of the process at about 90 degrees C. and stirred until cool.

The resulting product, upon cooling, showed excellent emulsifying properties and had other interface modifying properties.

*Example II*

To 400 parts by weight of triethanolamine there were added 3 parts by weight of sodium stearate and the mixture was heated with stirring for 4 hours at 260 degrees C. to produce a polymerized triethanolamine.

To 200 parts by weight of said polymerized triethanolamine there were added 160 parts by weight of coconut oil and 1 part by weight of sodium hydroxide and the mass was heated for 30 minutes at 250 degrees C. whereupon the reaction mass became homogeneous.

To 25 parts by weight of the resulting product cooled to 90 degrees C., there were added 10 parts by weight of the pyrophosphoric acid ester of diethylene glycol mono-laurate, previously heated to 90 degrees C., and the mixture was stirred until cool.

The resulting product, upon cooling, was an excellent emulsifying agent and had other good surface modifying properties.

*Example III*

(a) 100 parts by weight of monostearin, prepared from commercial stearic acid and glycerin, previously melted, were mixed with 100 parts by weight of polymerized commercial triethanolamine and the resulting mixture was heated to 150 degrees C., with stirring. After a few minutes, the mixture became homogeneous. It was kept at 150 degrees C. for about ten minutes and then cooled to 90 degrees C. and 100 parts by weight of monostearin pyrophosphate, previously heated to about 90 degrees C., were admixed therewith and stirred until the resultant product was cool.

(b) In an alternative embodiment of the above example, 200 parts by weight of monostearin pyrophosphate were admixed with 100 parts by weight of the previously prepared reaction product of polymerized triethanolamine and monostearin.

In each case, the final products showed valuable emulsifying and interface modifying properties.

Instead of proceeding as described above, the order of the steps may be reversed. Thus, for example, the oxygenated sulphur, oxygenated phosphorus, or oxygenated boron compound can initially be reacted with the polymerized alkylolamine at temperatures in the neighborhood of 90 degrees C. or 100 degrees C. and the resulting product then reacted with a higher acyl halide such as stearoyl chloride or coconut oil fatty acid chlorides in the presence of pyridine or other suitable alkaline material or amine to neutralize or take up the hydrochloric acid which forms in the reaction. The amount of acyl halide employed determines the number of acyl groups present in the final product and this can be controlled as desired. The following example is illustrative of this mode of procedure:

*Example IV*

To 55 parts by weight of polymerized triethanolamine, produced in accordance with the first step in Example I, there were added 110 parts by weight of monostearin pyrophosphate prepared from commercial stearic acid, each being heated to 90 degrees C. before mixing. It was then reacted with 50 parts by weight of the acyl chloride of coconut oil fatty acids at room temperature, preferably in the presence of 75 parts by weight of pyridine, for several hours. The final product showed the same kinds of desirable properties described hereinabove. The amount of each of the reacting constituents may be widely varied depending upon the specific nature of the final product sought.

As described above, the compounds of our invention, among other valuable properties which they possess, are excellent emulsifying agents, particularly for water-in-oil emulsions. The following examples are illustrative of such use:

(A) To make a cosmetic cream, approximately 5 parts of the reaction product produced in accordance with Example I, as described above, were dissolved in 15 parts of petroleum jelly. To this mixture, 40 parts of a light mineral oil heated to 40 degrees F. were added. Then, while constantly stirring, 40 parts of water at 40 degrees C. were gradually added and the stirring was continued until the mass became cool. The resulting emulsion containing 40% water in the dispersed phase, possessed excellent stability even under adverse conditions of temperature and handling.

(B) To make a furniture polish, 5 parts of the reaction product of Example I, as described above, were mixed with 5 parts carnauba wax and 50 parts of a light mineral oil. This mixture was heated to 80 degrees C. until dissolution or dispersion of the ingredients took place and then 40 parts of water at 40 degrees C. were added slowly with constant stirring until the mixture became cool. A smooth emulsion having excellent stability against separation of phases was obtained.

The word "higher", as employed herein, when referring, for example, to higher molecular weight fatty acids or the like, will be understood to mean at least six carbon atoms unless otherwise specifically stated.

What we claim as new and desire to protect by Letters Patent of the United States is:

1. The process which comprises polymerizing alkylolamines at elevated temperatures and preferably in the presence of a polymerization catalyst to produce polymers containing at least two nitrogen atoms, then reacting the resulting polymers with a member of the group consisting of carboxylic acids and alcohols containing a chain of at least six carbon atoms and derivatives thereof capable of producing esters and ethers to produce esters and ethers of said polymerized alkylolamines and finally reacting the resulting product with a substance selected from the group consisting of acid-reacting oxygenated phosphorus, oxygenated sulphur, and oxygenated boron derivatives of alcohols containing at least six carbon atoms.

2. The process which comprises polymerizing alkylolamines at temperatures of about 200 degrees C. to 250 degrees C. to produce polymers containing at least two nitrogen atoms, then reacting the resulting polymers with a member of the group consisting of carboxylic acids and alcohols containing a chain of at least six carbon atoms and derivatives thereof capable of producing esters and ethers to produce esters and ethers of said polymerized alkylolamines, and finally reacting the resulting product with a substance selected from the group consisting of acid-reacting oxygenated phosphorus, oxygenated sulphur, and oxygenated boron derivatives of alcohols containing at least six carbon atoms.

3. The process of claim 2 wherein the alkylolamine is predominantly a tertiary alkylolamine.

4. The process of claim 1 wherein the acid reacting substance corresponds to the following general formula $$(RO)_v - X - Y_w$$

wherein R is a member selected from the group consisting of alkyl and acyl radicals containing at least six carbon atoms, X is the radical of a polyhydroxy substance, Y is a member selected from the group consisting of oxygenated phosphorus, oxygenated sulphur, and oxygenated boron radicals which is attached to the polyhydroxy substance through an ester linkage, and $v$ and $w$ are small whole numbers.

5. The process of claim 2 wherein the carboxylic acid is a fatty acid and wherein the acid reacting substance corresponds to the following general formula $$(RO)_v-X-Y_w$$

wherein R is a member selected from the group consisting of alkyl and acyl radicals containing at least six carbon atoms, X is the radical of a polyhydroxy substance selected from the group consisting of glycerol, glycol, polyglycerols, polyglycols, sugars, sugar alcohols, and hydroxycarboxylic acids, Y is a member selected from the group consisting of oxygenated phosphorus, oxygenated sulphur, and oxygenated boron radicals which is attached to the polyhydroxy substance through an ester linkage, and $v$ and $w$ are small whole numbers.

6. The process of claim 2 wherein the carboxylic acid is a fatty acid.

7. The process of claim 2 wherein the carboxylic acid is a fatty acid containing between 12 and 18 carbon atoms.

8. The process which comprises polymerizing an alkylolamine at elevated temperatures to produce a polymer containing at least two nitrogen atoms, then re-esterifying a member selected from the group consisting of triglyceride oils and fats with said polymerized alkylolamine at a temperature of about 200 degrees C. to 250 degrees C. to produce esters of said polymerized alkylolamine, and finally reacting the resulting product with a substance selected from the group consisting of acid reacting oxygenated phosphorus, oxygenated sulphur, and oxygenated boron derivatives of alcohols containing at least six carbon atoms.

9. The process of claim 8 wherein the alkylolamine is predominantly a tertiary alkylolamine.

10. The process of claim 8 wherein the triglyceride oil is coconut oil.

11. The process of claim 8 wherein the alkylolamine is predominantly triethanolamine and the oil is coconut oil.

12. The process of claim 8 wherein the alkylolamine is predominantly triethanolamine, the triglyceride oil is coconut oil, and the acid-reacting oxygenated phosphorus compound is predominantly a phosphoric acid ester of a fatty acid monoglyceride the fatty acid radical of which contains at least six carbon atoms.

13. The process which comprises polymerizing triethanolamine at elevated temperatures to produce polymers containing at least two nitrogen atoms, reesterifying about 10 parts by weight of coconut oil with an approximately equal amount by weight of said polymerized triethanolamine at a temperature between about 230 degrees C. and 250 degrees C. to produce esters of polymerized triethanolamine, and reacting the resulting product with monostearin pyrophosphate.

14. The process of claim 2 wherein the acid-reacting substance is a phosphoric acid ester of a monoglyceride of a fatty acid containing at least six carbon atoms.

15. The process of claim 2 wherein the acid-reacting substance is a pyrophosphoric acid ester of a monoglyceride of a fatty acid containing between 12 and 18 carbon atoms.

16. The process of claim 2 wherein the acid-reacting substance is a member selected from the group consisting of oxygenated phosphorus, oxygenated sulphur, and oxygenated boron esters of aliphatic alcohols containing at least six carbon atoms.

17. The process of claim 8 wherein the acid-reacting substance is a pyrophosphoric acid ester of a monoglyceride of a fatty acid containing between 12 and 18 carbon atoms.

18. The reaction product of a carboxylic acid ester of a polymerized alkylolamine, the carboxylic acid radical of which contains at least six carbon atoms, and a member of the group consisting of acid-reacting oxygenated phosphorus, oxygenated sulphur, and oxygenated boron derivatives of alcohols containing at least six carbon atoms.

19. Reaction products in accordance with claim 18 wherein the carboxylic acid is a fatty acid containing between 12 and 18 carbon atoms.

20. The reaction product of a fatty acid ester of a polymerized tertiary alkylolamine, the fatty acid radical of which contains at least six carbon atoms, with an acid-reacting chemical compound corresponding to the general formula $$(RO)_v-X-Y_w$$

wherein R is selected from the group consisting of alkyl and acyl radicals containing at least six carbon atoms, X is the radical of a polyhydroxy substance, Y is a member selected from the group consisting of oxygenated phosphorus, oxygenated sulphur, and oxygenated boron radicals which is attached to the polyhydroxy substance through an ester linkage, and $v$ and $w$ are small whole numbers.

21. The reaction product of a fatty acid ester of a polymerized alkylolamine, the fatty acid radical of which contains at least six carbon atoms, with an acid reacting phosphoric acid ester of a higher fatty acid monoglyceride.

22. The reaction product of a fatty acid ester of a polymerized alkylolamine, the fatty acid radical of which contains at least six carbon atoms, with an acid-reacting pyrophosphoric acid ester of a monoglyceride of a fatty acid containing between 12 and 18 carbon atoms.

23. The reaction product of claim 22 wherein the alkylolamine is predominantly triethanolamine.

24. The reaction product of a fatty acid ester of a polymerized alkylolamine, the fatty acid radical of which contains at least six carbon atoms, and a member selected from the group consisting of acid-reacting oxygenated phosphorus, oxygenated sulphur, and oxygenated boron derivatives of alcohols containing at least six carbon atoms.

25. The reaction product of an acid-reacting phosphoric acid ester of a monoglyceride of a fatty acid containing at least six carbon atoms and the mixture resulting from the reesterification of a member selected from the group consisting of triglyceride oils and fats with a polymerized alkylolamine.

26. The reaction product of an acid-reacting pyrophosphoric acid ester of a monoglyceride of a fatty acid containing between 12 and 18 carbon atoms and the mixture resulting from the reesterification of coconut oil with polymerized triethanolamine.

27. The reaction product of an acid-reacting phosphoric acid ester of a monoglyceride of a fatty acid containing at least six carbon atoms and the mixture resulting from the reesterification of a member selected from the group consisting of triglyceride oils and fats with polymerized tertiary alkylolamines.

28. The process of claim 8 wherein the acid-reacting substance corresponds to the general formula $$(RO)_v-X-Y_w$$

wherein R is a member selected from the group consisting of alkyl and acyl radicals containing at least six carbon atoms, X is the residue of a polyhydroxy substance, Y is a member selected from the group consisting of oxygenated phosphorus, oxygenated sulphur, and oxygenated boron radicals which is attached to the polyhydroxy substance through an ester linkage, and $v$ and $w$ are small whole numbers.

MORRIS B. KATZMAN.
ALBERT K. EPSTEIN.